United States Patent
Wallace

(10) Patent No.: US 8,587,672 B2
(45) Date of Patent: Nov. 19, 2013

(54) REAL-TIME VISIBLE-TALENT TRACKING SYSTEM

(75) Inventor: Bruce Allen Wallace, Mendham, NJ (US)

(73) Assignee: Home Box Office, Inc., New York, NY (US)

( * ) Notice: Subject to any disclaimer, the term of this patent is extended or adjusted under 35 U.S.C. 154(b) by 375 days.

(21) Appl. No.: 13/017,510

(22) Filed: Jan. 31, 2011

(65) Prior Publication Data

US 2012/0195574 A1 Aug. 2, 2012

(51) Int. Cl.
*H04N 5/228* (2006.01)

(52) U.S. Cl.
USPC ............. 348/208.14; 348/211.9; 348/222.1

(58) Field of Classification Search
USPC ........ 348/208.14, 211.1, 211.2, 211.9, 222.1, 348/231.3
See application file for complete search history.

(56) References Cited

U.S. PATENT DOCUMENTS

| | | | |
|---|---|---|---|
| 5,642,285 A | 6/1997 | Woo et al. | |
| 5,881,321 A | 3/1999 | Kivolowitz | |
| 7,035,440 B2 * | 4/2006 | Kaku | 348/169 |
| 7,430,314 B2 | 9/2008 | Porter et al. | |
| 7,587,419 B2 | 9/2009 | Thorpe et al. | |
| 7,599,960 B2 | 10/2009 | Yamamoto et al. | |
| 2004/0178955 A1 | 9/2004 | Menache et al. | |
| 2004/0239777 A1 * | 12/2004 | Nakamura et al. | 348/239 |
| 2006/0170791 A1 | 8/2006 | Porter et al. | |
| 2006/0265452 A1 * | 11/2006 | Shirasaka | 709/204 |
| 2007/0200930 A1 | 8/2007 | Gordon | |
| 2007/0257985 A1 | 11/2007 | Estevez et al. | |
| 2007/0268406 A1 | 11/2007 | Bennett | |
| 2008/0018784 A1 | 1/2008 | Bennett | |
| 2008/0129824 A1 | 6/2008 | Loveless | |
| 2008/0225137 A1 | 9/2008 | Kubo et al. | |

(Continued)

FOREIGN PATENT DOCUMENTS

| | | |
|---|---|---|
| EP | 1102276 A1 | 5/2001 |
| EP | 0735510 B1 | 11/2004 |
| EP | 1871100 A2 | 12/2007 |
| EP | 1998554 A1 | 12/2008 |

OTHER PUBLICATIONS

"3-D Viewing: the Synthetic Camera," 2001 [Retrieved from the Internet on or before Aug. 16, 2010] (19 pages).

(Continued)

*Primary Examiner* — Gevell Selby
(74) *Attorney, Agent, or Firm* — Mendelsohn, Drucker & Dunleavy, P.C.; Edward J. Meisarosh; Steve Mendelsohn

(57) ABSTRACT

In one embodiment, a movie set includes a motion-picture camera and a visible-talent tracking system having several elements. Based on the camera's characteristics, items in a portion of the movie set called the view frustum will appear in focus in the film. The camera and a camera-tracking system provide camera-location, orientation, and settings information to a culling processor. The culling processor delineates the location and dimensions of the view frustum based on the received camera information. Wireless tags are attached to talent on set. A tag-locating system tracks the real-time respective locations of the wireless tags and provides real-time spatial information regarding the tags to the culling processor, which determines which tags, if any, are considered to be within the view frustum, and provides information associated with the intra-frustum tags to a track recorder for recording along with the corresponding film frames. That information is variously used after editing.

30 Claims, 3 Drawing Sheets

(56) References Cited

U.S. PATENT DOCUMENTS

| | | |
|---|---|---|
| 2009/0091629 A1 | 4/2009 | Casey |
| 2009/0259623 A1 | 10/2009 | Mooneyham et al. |
| 2010/0002084 A1* | 1/2010 | Hattori et al. ............ 348/207.1 |
| 2010/0005070 A1 | 1/2010 | Moriya et al. |
| 2010/0026809 A1 | 2/2010 | Curry |

OTHER PUBLICATIONS

"Ubisense Real-Time Location Fact Sheet," 2009 [Retrieved from the internet on or before Aug. 16, 2010] (6 pages).

Chen, Bing-Yu, "Computer Graphics," National Taiwan University, 2006 [Retrieved from the Internet on or before Aug. 16, 2010] (45 pages).

Sunar, Mohd Shahrizal et al., "Improved View Frustum Culling Technique for Real-Time Virtual Heritage Application," The International Journal of Virtual Reality 7(3), 2008, pp. 43-48.

Foley, James D. et al., "Computer Graphics Principles and Practice" 2nd edition, 1990, Chapter 6, pp. 229-281.

"Cooke Optics Limited: Products: /i Technology," 2009 [Retrieved from http://www.cookeoptics.com/cooke.nsf/products/itech.html] [Retrieved from the Internet on Feb. 9, 2011] (3 pages).

"Cooke Optics Limited: Products: /i Datalink," 2009 [Retrieved from http://www.cookeoptics.com/cooke.nsf/products/datalink.html] [Retrieved from the Internet on Apr. 6, 2010] (1 page).

"Cooke Optics Limited: Products: /i Lens Display System," 2009 [Retrieved from http://www.cookeoptics.com/cooke.nsf/products/lensdisplay.html] [Retrieved from the Internet on Apr. 6, 2010] (1 page).

"Cooke Optics Limited: Technical Resources: Free Downloads," 2009 [Retrieved from http://www.cookeoptics.com/cooke.nsf/itech/downloads.html] [Retrieved from the Internet on Apr. 6, 2010] (1 page).

* cited by examiner

REAL-TIME VISIBLE-TALENT TRACKING SYSTEM

BACKGROUND OF THE INVENTION

1. Field of the Invention

The current invention relates to systems and methods for tracking the locations of actors on a movie set, and more specifically but not exclusively, to tracking the locations of the actors based on wirelessly communicative identification tags worn by the actors on the movie set in relation to the scene being recorded.

2. Description of the Related Art

A typical movie set includes at least a camera and one or more actors, referred to herein as "talent." The term "movie set" as used herein may refer to any equipment and personnel set-up for electronically recording visual content for generating finished motion-picture programs such as, but not limited to, movies, television programs, and commercials. For ease of reference, finished motion-picture programs are generically referred to herein as "films." In order to produce a film, first, a relatively large amount of visual content is recorded in one or more movie sets. Then, this large amount is pared down to the final cut of the film in an editing process. For some films, it is important to determine, for each actor appearing in the film, the amount of visible on-screen time in the film for the actor.

Past efforts to identify talent within frames of recorded film footage have been done either by relatively labor-intensive human recognition and identification, or by automated facial recognition processing. The former is not entirely foolproof and relies on reliable facial comparison photos, while the computerized facial recognition process requires a sufficient degree of clarity and differentiation to achieve an accurate match. Automated facial recognition has been somewhat successful in news broadcast with full, well-lit headshots, but this is not the case for many motion picture recordings.

SUMMARY OF THE INVENTION

One embodiment of the invention can be a system comprising a real-time view-frustum (RTVF) culling processor adapted to (i) receive tag-associated data for each of one or more wireless tags, (ii) receive camera information for a film segment generated by a camera, (iii) process the received camera information to determine, for the film segment, a view frustum of the camera, and (iv) correlate the tag-associated data with the view frustum for the film segment to generate frustum-culling information identifying one or more of the wireless tags as intra-frustum tags within the view frustum.

Another embodiment of the invention can be a computer-implemented method comprising (i) receiving tag-associated data for each of one or more wireless tags, (ii) receiving camera information for a film segment generated by a camera, (iii) processing the received camera information to determine, for the film segment, a view frustum of the camera, and (iv) correlating the tag-associated data with the view frustum for the film segment to generate frustum-culling information identifying one or more of the wireless tags as intra-frustum tags within the view frustum.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
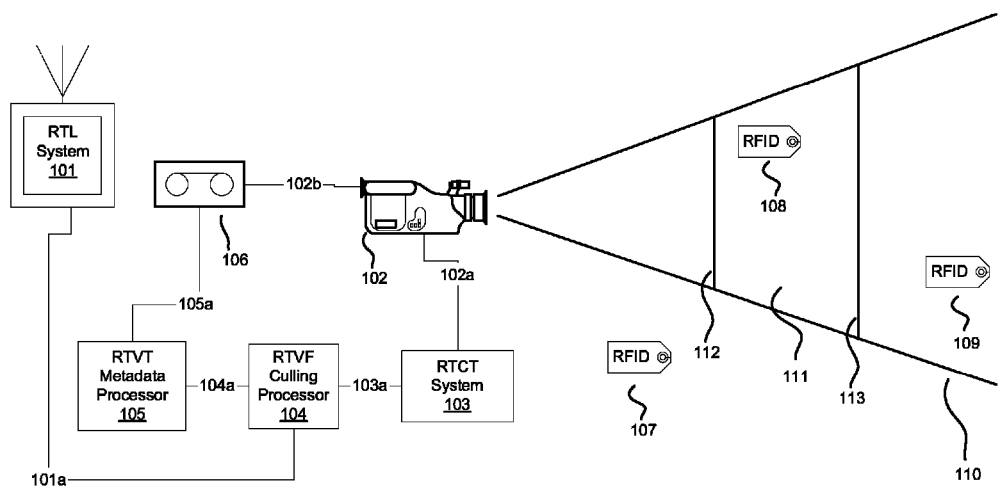
FIG. 1 shows a real-time visible-talent (RTVT) tracking system at a movie set, in accordance with one embodiment of the invention.

It should be noted that, as used herein, the term "film" refers to any medium that stores image information that can be converted into one or more visible images, regardless of whether the stored image information itself comprises any visible images. In other words, "film" may be, for example, film stock, photographic film, or a digital file containing information for still and/or moving images. A film contains information for one or more images, each of which may be treated as a still and referred to as a frame. As used herein, the term "film segment" refers to a portion of the film corresponding to one or more frames. Note that the film segment may comprise the entirety of the film.

As noted above, it is sometimes important to be able to identify visible on-screen talent in a film. One way of doing this involves tracking, for each frame of the film, the actors visible in that frame. Accurate and automatic identification of an actor who clearly appears on screen (sometimes referred to as "on camera") within any frames of edited film footage is important for two reasons. First, to properly and contractually compensate that talent for any royalties based on subsequent broadcast or usage of those frames. Second, to facilitate in the searching and identification of that talent during broadcast or usage by a viewer.

A system and method is presented herein for determining and recording the identification of on-screen talent as part of a film recording. The system involves attaching to the talent radio-frequency identification (RFID) tags that are used to generate real-time location (RTL) data for the talent. The RTL data is used to determine which talent, if any, is within the camera view frustum. The camera view frustum, in turn, is calculated from real-time camera-tracking system data received from the recording camera. The visible talent data is recorded as a simultaneous metadata track on the recording medium along with the recorded film frames.

One embodiment of the invention comprises the following components, described in further detail subsequently:

A real-time location (RTL) system that provides accurate (e.g., within 10 cm) real-time identification, spatial, and time data from active RFID tags attached to talent;

A real-time camera-tracking (RTCT) system that provides a continuous remote readout of camera settings, such as, for example, the lens position, orientation, focus setting, T stop, and depth-of-field, provided by electronics inside an appropriately equipped camera;

A real-time view-frustum culling processor that provides the necessary determination of the boundaries of the camera's view frustum, calculated using the RTCT system data. Once the boundaries of the frustum are determined, it may be determined which RFID tags are in and/or near the view frustum;

A real-time visible-talent (RTVT) metadata processor that transforms and maps three-dimensional (3-D) coordinates from the RTL and RTCT systems into two-dimensional (2-D) coordinates of the motion picture frames, which can subsequently be used during playback to add identification overlays on the active imagery corresponding to the visible talent;

A track recorder that provides any needed transformation and/or formatting of the RTL system, RTCT system, and/or related talent-data information in order to record a per-frame simultaneous RTVT data track, corresponding to the recording of visual and audio tracks.

During the playback of frames of recorded film footage, an embodiment of this invention uses an RTVT metadata decoder and an adjunct display. The RTVT metadata decoder decodes the RTVT data track to extract information such as 2-D coordinates for talent relative to the frame. The extracted information may then be used to add information overlays corresponding to the visible talent shown on the adjunct display, where the overlay is an example of a so-called area of interest.

FIG. 1 shows real-time visible-talent (RTVT) tracking system 100 at a movie set. RTVT tracking system 100 includes real-time location (RTL) system 101, camera 102, real-time camera-tracking (RTCT) system 103, real-time view-frustum (RTVF) culling processor 104, RTVT metadata processor 105, track recorder 106, and exemplary RFID tags 107, 108, and 109.

RTL system 101 provides real-time identification, spatial, and time data (e.g., tag ID; x, y, and z coordinates of the tag; and time t) for exemplary RFID tags 107, 108, and 109, each attached to a corresponding actor in the vicinity of RTL system 101 (in other words, on the corresponding movie set). Note that the tag ID identifies the tag, while the x, y, and z coordinates provide the spatial coordinates of the identified tag at time t. Coordinates x, y, and z may be, for example, Cartesian coordinates, or any other suitable coordinates that may be translated into Cartesian coordinates (e.g., cylindrical or spherical coordinates). The origin and orientation for the particular coordinate system used may be set anywhere suitable.

Time t may, for example, (i) be the local time where RTVT tracking system 100 is located, (ii) be the time at a different locale, or (iii) represent an incremental time from some selected starting time. Note that film frames are typically identified by a time code that indicates the frame's location, in terms of time, within the continuum of the frames of the film. Since film recording may be started and stopped at will, the time-code difference between two frames may not necessarily correlate to the difference in time between the recording time of the earlier frame and the recording time of the later frame. Consequently, RTVT tracking system 100 uses an independent clock (not shown) in order to time-stamp data points with the time t, as appropriate. As used herein, "time code" refers to the time-code tracking used for film frames, while "time stamp" refers to a recordation of time t as described above. RTVT tracking system 100 correlates film time codes with real-time time stamps.

The following example is presented to illustrate some similarities and differences between time stamps and time codes. At time t=09:02:57.44, where the time stamp is in the form HH:MM:SS.SS (hours, minutes, seconds, and fractions of second), the frame having the time code 00:02:03:25, where the time code is in the form HH:MM:SS:FF (hours, minutes, seconds, frame number) may be recorded by camera 102. The time stamp and time code are then associated so that data affiliated with one may be synchronized with other data affiliated with either the time stamp or time code.

In one implementation, RTL system 101 comprises the Ubisense Location Platform from Ubisense, Ltd., of Cambridge, the United Kingdom, which provides information about the location of associated RFID tags. In this implementation, RFID tags 107, 108, and 109 are active tags that transmit ultra-wide-band (UWB) radio signals. Note that, in other implementations, the RFID tags may be passive RFID tags or differently powered RFID tags. RTL system 101 performs any necessary conversion of the coordinates into a common or canonical format for RTVT tracking system 100. RTL system 101 outputs tag-associated information, such as the identification, spatial, and time data for RFID tags 107, 108, and 109, via path 101a, to RTVF culling processor 104 for processing in conjunction with contemporary spatial information from other components of RTVT tracking system 100.

In one embodiment, camera 102 is a motion-picture camera adapted to generate a motion picture of visible objects within the camera's view cone 110, of which a cross section appears in FIG. 1. In one implementation, camera 102 is a digital video camera that comprises a lens and a light-sensitive sensor (not shown), where the lens is adapted to focus images on the sensor for transformation by camera 102 into video data for recording. The location and dimensions of view cone 110 are primarily determined by (i) the direction in which camera 102 is pointing (i.e., the orientation of camera 102) and (ii) the characteristics of the lens used by camera 102. Depending on the lens and the aperture setting of the lens, which determine a focus plane and a depth of field, only a portion of view cone 110 will appear in focus on the sensor of camera 102. An exemplary portion of view cone 110 whose contents will appear substantially in focus on the sensor of camera 102 is view frustum 111, of which a cross-section appears in FIG. 1. View frustum 111 corresponds to the space within view cone 110 that is between hither plane 112 and yon plane 113. Note that, with some camera settings, view frustum 111 might extend out infinitely. In other words, yon plane 113 may be at infinity. In such situations, yon plane 113 may be moved to some finite depth within view cone 110, using any appropriate formulation, in order to limit the size of view frustum 111. Hither plane 112 and yon plane 113 may also be moved forward or backward in other situations in order to accomplish other goals, in accordance with appropriate formulations.

Camera 102 comprises electronics that monitor the characteristics of the lens of camera 102 thereby allowing camera 102 to provide a continuous output of focus settings to RTCT system 103 via path 102a. The focus settings may include lens information, zoom setting, and T-stop setting. A T-stop is an exposure measure similar to the more-familiar photographic f-stop and may similarly be set by varying the size of the lens aperture, which controls the amount of light transmitted through the lens to the sensor. As would be understood by a person of ordinary skill in the art, varying the size of the lens aperture also affects the depth of field, where having a smaller aperture results in greater depth of field.

In one implementation, camera 102 comprises /i Technology from Cooke Optics, Ltd., of Leicester, the United Kingdom. Cooke's /i Technology provides a continuous readout of the precise position, orientation, focus setting, T-stop, and depth-of-field from electronics inside an appropriately equipped camera lens. Similar frame-by-frame lens data may be recorded from cameras not equipped with /i Technology by using /i-equipped lenses and the Cooke /i dataLink.

Camera 102 includes a position sensor (not shown) and an orientation sensor (not shown) used to determine the spatial location and orientation of camera 102. The position sensor determines the spatial location of camera 102 using a system such as the global-positioning system (GPS). The orientation sensor determines the orientation of camera 102 using an inertial sensor such as described in U.S. Pat. No. 5,881,321 to Kivolowitz, incorporated herein by reference in its entirety. Camera 102 continuously provides the determined position and orientation information for camera 102 to RTCT system 103 via path 102a. RTCT system 103 performs any necessary transformation of the position and orientation information to the common or canonical coordinate system for RTVT tracking system 100. RTCT system 103 also time-stamps the position and orientation information, if necessary.

RTCT system 103 also receives from camera 102 a continuous data stream indicating the time-code of each frame being generated by camera 102 at time t. RTCT system 103 also time-stamps the time-codes, if necessary. RTCT system 103 then correlates the position, orientation, and focus-setting information received from camera 102 to corresponding film-frame time-codes. This allows RTVT tracking system 100 to synchronize and correlate by time stamps (i) the position data from the RFID tags, (ii) the position, orientation, and focus-setting data from camera 102, and (iii) the film frame generated by camera 102. RTCT system 103 then provides camera information, such as the transformed, correlated, time-coded, and time-stamped camera position, orientation, and focus-setting information to RTVF culling processor 104 via path 103a.

RTVF culling processor 104 uses the camera position, orientation, and focus-setting information received from RTCT system 103 to calculate the dimensions of view frustum 111 for the recorded film frames and their corresponding time stamps. RTVF culling processor 104 then uses the time-stamped ID and position tag-associated information received from RTL system 101, for the RFID tags, to determine which RFID tags, if any, are considered to be within view frustum 111 for a particular video frame. The culling may be done, for example, as described in *Improved View Frustum Culling Technique for Real-Time Virtual Heritage Application*, by Sunar, Zin, and Sembok in the International Journal of Virtual Reality, 2008, 7(3): 43-48, incorporated herein by reference in its entirety. The culling may also be done, for example, as described in *Computer Graphics: Principles and Practice*, Second Edition, by James Foley, Andries va Dam, Steven Feiner, and John Hughes, Addison-Wesley Publishing Co., 1987, Chapter 6 (pp. 229-281), incorporated herein by reference in its entirety.

In the sample view shown in FIG. 1, RFID tag 108 is within view frustum 111, while RFID tags 107 and 109 are outside of view frustum 111. RTVF culling processor 104 provides, via path 104a, to RTVT metadata processor 105, culling information, per film frame, defining the dimensions of view frustum 111 and the identification and location within view frustum 111 of frustum-internal RFID tags, such as RFID tag 108. If the culling performed by RTVF culling processor 104 involves transformation into canonical coordinates for simplified calculations, then the culling information describing view frustum 111 and the location of RFID tag 108 may be in the canonical coordinates. Note, however, that some or all of this information may instead be in the original or in differently transformed coordinates.

RTVT metadata processor 105 generates metadata for the frames based on the received corresponding culling information. RTVT metadata processor 105 maps the 3-D location coordinates for the frustum-internal RFID tags (e.g., tag 108) and view frustum 111 received from RTVF culling processor 104 onto the 2-D coordinates of the corresponding frames. This mapping may be performed, for example, using the projection techniques taught in the above-referenced Chapter 6 of *Computer Graphics*. RTVT metadata processor 105 provides to track recorder 106 metadata regarding frustum-internal RFID tags correlated to a frame. The metadata for a particular frame includes (i) identification of the frustum-internal RFID tags and/or the associated talent and (ii) delineation of a 2-D area of interest on the frame associated with the RFID tag.

The size of a 2-D area of interest on the video frame may depend on a determined depth of the RFID tag within view frustum 111. The depth of a tag may be tracked, for example, as a distance from (i) camera 102, (ii) hither plane 112, (iii) yon plane 113, or (iv) another appropriate reference element. As would be understood by a person of ordinary skill in the art, the further away an actor is from camera 102 for a frame, the smaller the actor would appear on the frame and, consequently, the smaller the corresponding area of interest should be. Note that the depth information for a tag in a particular frame may be included in the metadata for the frame, or may be derived from the delineation of the corresponding 2-D area of interest.

Track recorder 106 receives a stream of frames from camera 102 via path 102b. Track recorder 106 records the metadata associated with the frustum-internal RFID tags that is received from RTVT metadata processor 105 via path 105a along with the corresponding frame received from camera 102 via path 102b. In other words, track recorder 106 records the original footage captured by camera 102 along with corresponding metadata. This original footage, along with the corresponding metadata, is later edited and cut to generate the finished film that maintains, for the remaining frames, the corresponding metadata. Note that the editing is typically performed by people with the aid of computers.

The above-described metadata that is recorded by track recorder 106 may include one or more types of information that may depend on the type of RFID tag used and/or on data correlation performed by track recorder 106. For example, in one implementation, where an RFID tag has an immutable ID, track recorder 106 includes a database (not shown) that correlates the RFID tag's ID with a talent identifier that identifies the talent associated with the RFID tag for the scene being filmed so that the corresponding metadata that is recorded includes the talent identifier along with spatial information. In another implementation, where an RFID tag has a programmable ID, the RFID tag is programmed for a scene with an identifier for the associated talent, that talent identifier is then recorded as part of the metadata. In this way, later uses of the recorded film have information directly correlating on-screen talent to talent identifiers. A talent identifier may, for example, be an actor's name or an alphanumeric identifier associated with the actor.

Figure 2:
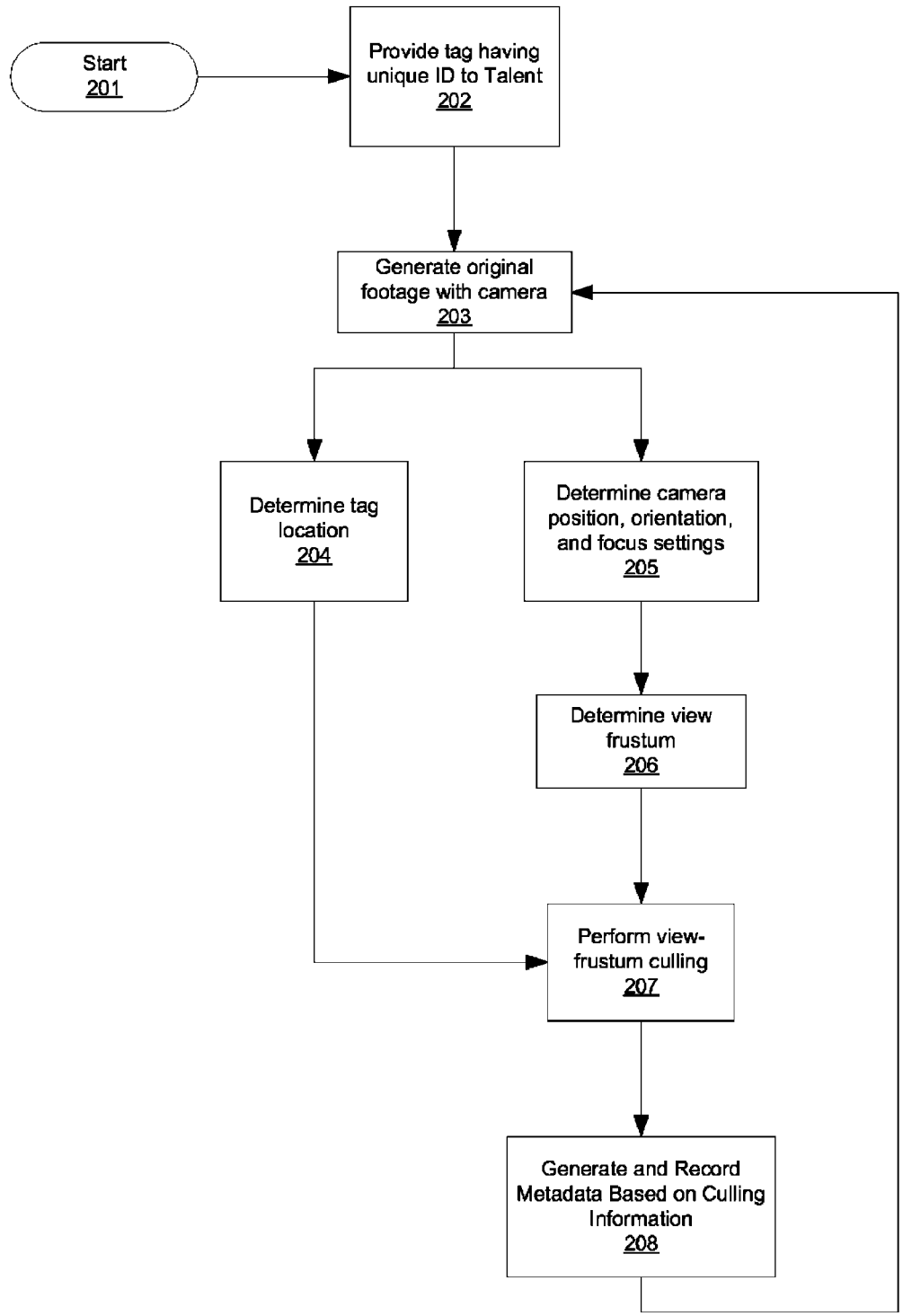
FIG. 2 shows a flowchart for an exemplary operation of the RTVT tracking system of FIG. 1.

FIG. 2 shows flowchart 200 for an exemplary operation of RTVT tracking system 100 of FIG. 1. The operation starts (step 201) with the provision of tags having unique IDs to the talent (step 202). Original footage is then generated by camera 102 (step 203). While camera 102 generates original footage, for every frame, tag locations are determined (step 204) and camera position, orientation, and focus settings are determined (step 205). Using the camera information obtained in step 205, the view frustum is determined (step 206). Using the view frustum determined in step 206 and the tag location determined in step 204, view-frustum culling is performed (step 207) to determine which tags are inside the view frustum for the frame. Metadata is generated based on the culling information and the metadata is recorded with the corresponding frame (step 208) and the process returns to step 203 for the next frame.

Figure 3:
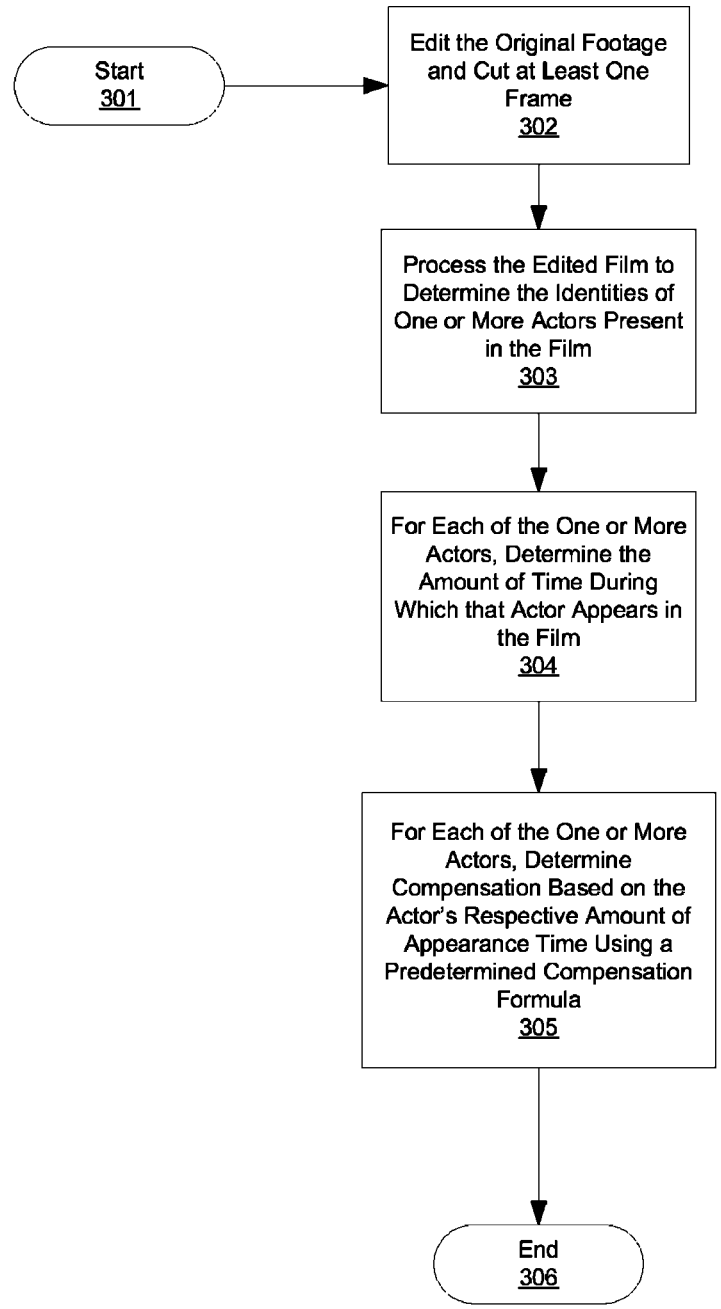
FIG. 3 shows a flowchart for an exemplary post-recording process for the original footage generated in accordance with the flowchart of FIG. 2

FIG. 3 shows flowchart 300 for an exemplary post-recording process for the original footage generated in accordance with flowchart 200 of FIG. 2. The process starts (step 301) with the editing of the original footage (step 302), where the editing includes cutting at least one frame from the original footage. Next, the edited film is processed, frame-by-frame, to determine, based on the corresponding metadata, the identities of one or more actors present in the film (step 303) and, for each of the one or more actors, determine the amount of time during which that actor appears in the film (step 304) substantially in focus. Compensation for each of the one or more actors appearing in the film is then determined based on the actor's respective amount of appearance time using a predetermined compensation formula (step 305), such as one determined by each actor's corresponding contract. The process then terminates (step 306).

In one embodiment, RTVT tracking system 100 determines a resolvability level for each tag determined to be in view frustum 111 of FIG. 1 for a particular frame. The resolvability level provides an indication of the likelihood that a viewer looking at the frame would be able to resolve the image of the talent associated with the tag and/or identify the talent. Resolvability can be based, for example, on the depth of the tag within view frustum 111, as discussed above. As would be understood by a person of ordinary skill in the art, the further from the camera an actor is, the smaller the actor appears in the corresponding frame and, consequently, the more difficult it becomes for a viewer to identify the actor in the frame. Note that adjustments of the hither and yon planes, described above, may be based on a predicted resolvability for talent. Thus, for example, yon plane 113 may be moved closer to hither plane 112 in order to exclude from view frustum 111 tags whose associated talent would not be resolvable.

Resolvability may also, for example, be based on the number of other tags determined to be in view frustum 111, since an actor far from the camera may be difficult to resolve but may still be identifiable if the actor is the only person in the scene. The determined resolvability level for an intra-frustum tag may be included in the metadata associated with the frame and may be used in determining compensation for the associated talent. Thus, for example, compensation for an actor in a frame may be diminished or eliminated at lower resolvability levels since the actor would likely not be resolvable and/or identifiable at the low resolvability level.

In one embodiment, where compensation includes a royalty component, compensation for an actor in a film frame is based on both the corresponding determined resolvability level and the type of playback device on which the film is played back. An actor at a particular resolvability level in a frame may be resolvable on a large and/or high-resolution screen but not be resolvable on a small and/or low-resolution screen. As a result, for example, an actor having a high level of resolvability in a frame may receive compensation for viewings of that frame regardless of the playback device, while another actor having a lower level of resolvability receives reduced or no compensation for viewings on playback devices with smaller and/or lower-resolution screens, such as, for example, some mobile devices.

In one embodiment, the metadata is used during playback of the motion-picture product to provide information to a viewer of the motion-picture product. The information may be provided to the viewer sua sponte or may be provided in response to a request by the viewer for information about talent appearing in a particular portion of a playback display device.

Figure 4:
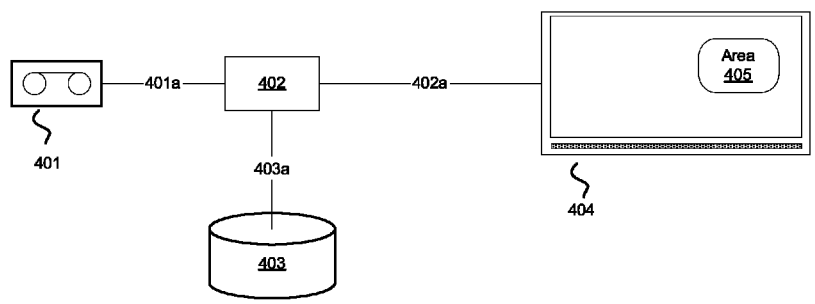
FIG. 4 shows an exemplary playback system for the described motion-picture product, in accordance with one embodiment of the invention.

FIG. 4 shows exemplary playback system 400 for the above-described motion-picture product. Playback system 400 comprises video source 401, display processor 402, database 403, and interactive display 404. Video source 401 provides the motion-picture product to display processor 402 via path 401a. The motion-picture product includes the above-described metadata. Database 403, connected to display processor 402 via path 403a, contains information about talent, where the information is correlated to the metadata. Display processor 402 provides the motion-picture product to interactive display 404 via path 402a. If a user of interactive display 404 indicates that the user wants information about a location within exemplary area of interest 405 of display 404, then display 404 provides location information for the selected location to display processor 402. Display processor 402 then determines that the selected location is within area of interest 405 and determines which tag corresponds to area of interest 405 to determine a target tag. If the user-selected location is not within an area of interest, then processor 402 may provide information about a tag associated with the closest area of interest to the selected location or processor 402 may indicate to the user that no information is available for the selected location.

Display processor 402 then queries database 403 for information, such as talent name, corresponding to the target tag, formats the information received from database 403, and overlays the formatted information on the video provided to display 404 so that the user sees the requested information. The location and duration of the display overlay may be predetermined, may be dynamically determined, or may be user-defined. Note that, if the metadata already contains the information sought by the user then the step of querying database 403 may be skipped since the information may be obtained directly from the metadata. In one alternative implementation of playback system 400, where the metadata contains sufficient data, playback system does not include database 403.

In an alternative implementation of playback system 400, a viewer provides an actor's name to interactive display 404, which, in turn, provides the name to display processor 402. Display processor 402 queries database 403 to determine corresponding metadata for the named actor. If display processor 402 then receives from video source 401 video frames including metadata corresponding to the named actor, then display processor 402 highlights a corresponding portion of the frames to make identification of the named actor easier.

An embodiment of the invention has been described with one system for synchronizing and/or correlating data from several sources, such as RFID tags 107, 108, and 109 and camera 102 of FIG. 1. Various alternative synchronization and/or correlation means may be used without departing from the scope of the invention. For example, in one alternative embodiment, time codes are not used to synchronize frames and corresponding metadata. Instead, only time stamps are used for synchronizing frames and corresponding metadata. In another alternative implementation, only time codes are used to synchronize frames and corresponding metadata.

In yet another alternative embodiment, neither time codes nor time stamps are used to synchronize frames and their corresponding metadata. In one implementation, the processing delays of the components of RTVT tracking system 100 are known and substantially fixed, thereby allowing track recorder 106 to associate each received frame with the correct corresponding metadata. In one implementation, the processing delays of the components of RTVT tracking system 100 are so minimal as to allow the components to operate as though substantially synchronized.

An embodiment of the invention has been described where metadata is recorded alongside the corresponding frame. For film stock, for example, this would include recording the metadata alongside the corresponding frame in a manner similar to the recording of an audio track alongside the corresponding frame on film stock. For digitally stored film, for example, this can include recording the metadata in the same or adjacent logical location as the corresponding frame. In one alternative embodiment, the metadata is recorded in a location not alongside the corresponding frame. In one implementation, the metadata is stored in a database with sufficient identifying information to allow association of the metadata with the corresponding frame and/or vice versa.

An embodiment of the invention has been described with particular position-locating systems for elements such as RFID tags 107, 108, and 109 and camera 102 of FIG. 1. As would be appreciated by one of ordinary skill in the art, various alternative position-locating systems may be used without departing from the scope of the invention. For example, in one alternative implementation, instead of relying on GPS positioning, the camera may be equipped with an RFID tag (not shown) compatible with RTL system 101, which determines the position of camera 102 at time t and provides that information to RTCT system 103 (path not shown) for processing and determining view cone 110.

Embodiments of the invention have been described where a 2-D tag-associated area of interest is determined for a frame based on a location of an RFID tag inside a corresponding view frustum. The dimensions of an area of interest corresponding to a tag may be determined by any one of a multitude of methods. The area-of-interest dimensions may be preset. The area-of-interest dimensions may depend on the talent associated with the tag. The area-of-interest dimensions may depend on information indicating where on the talent the tag is located. The area-of-interest dimensions may be dynamically determined based on the tag's motions in preceding and/or succeeding frames. In one alternative implementation, the area-of-interest dimensions are determined based on the placement of two tags on each actor, where their relative motion and/or position provide a better indication of the position and orientation of the corresponding talent.

An embodiment of the invention has been described using a particular RTL system and RFID tags in order to get spatial information. In one alternative embodiment, spatial information is acquired using generic wireless tags and a position-determining system for video recording as described in U.S. Pat. App. Pub. No. 2008/0225137 to Kubo et al., incorporated herein by references in its entirety.

An embodiment of the invention has been described using a particular level of informational granularity, where information for tags and/or talent is tracked on a frame-by-frame basis. In other words, the described embodiment uses the frame as the film segment for processing by RTVT tracking system 100 of FIG. 1. Alternative embodiments of the invention may have finer or coarser informational granularity where information is tracked for units other than frames such as, for example, (i) multiple frames, (ii) time periods shorter than a frame, or (iii) time periods longer than a frame. In other words, alternative embodiments may use film segments that do not correspond on a one-to-one basis to respective frames.

An embodiment of the invention has been described where the metadata for a particular frame includes delineation of one or more 2-D areas of interest on the video frame associated with corresponding one or more RFID tags. In one alternative embodiment, the metadata does not include area-of-interest information. Instead, the metadata simply identifies the frustum-internal RFID tags and/or the associated talent. This is useful for applications, such as determining what talent appears in any subset of frames of the film, where the talent's location in the frame is not important.

An embodiment of the invention has been described wherein camera 102 of FIG. 1 is a video camera. In one alternative embodiment, the camera used in RTVT tracking system 100 is a motion-picture camera that uses film stock. In one implementation, the metadata for a particular frame is recorded adjacent to the frame on the film stock. In another implementation, the metadata is recorded elsewhere with sufficient information to correlate the metadata with the corresponding frame.

In another alternative embodiment, the camera used in RTVT tracking system 100 of FIG. 1 is a still camera, where each photograph that the still camera captures is treated as a film segment. In other words, each captured still photograph is treated and processed as one of the individual frames described above.

References herein to the verb "to set" and its variations in reference to values of fields do not necessarily require an active step and may include leaving a field value unchanged if its previous value is the desired value. Setting a value may nevertheless include performing an active step even if the previous or default value is the desired value.

Unless indicated otherwise, the term "determine" and its variants as used herein refer to obtaining a value through measurement and, if necessary, transformation. For example, to determine an electrical-current value, one may measure a voltage across a current-sense resistor, and then multiply the measured voltage by an appropriate value to obtain the electrical-current value. If the voltage passes through a voltage divider or other voltage-modifying components, then appropriate transformations can be made to the measured voltage to account for the voltage modifications of such components and to obtain the corresponding electrical-current value.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been drawn as bidirectional do not have to be used to pass data in both directions.

References herein to the verb "to generate" and its variants in reference to information or data do not necessarily require the creation and/or storage of new instances of that information. The generation of information could be accomplished by identifying an accessible location of that information. The generation of information could also be accomplished by having an algorithm for obtaining that information from accessible other information.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

I claim:

1. A system comprising:
   a real-time view-frustum (RTVF) culling processor adapted to:
      receive tag-associated data for each of one or more wireless tags;
      receive camera information for a film segment generated by a camera;
      process the received camera information to determine, for the film segment, a view frustum of the camera; and
      correlate the tag-associated data with the view frustum for the film segment to generate frustum-culling information identifying one or more of the wireless tags as intra-frustum tags within the view frustum.

2. The system of claim 1, further comprising a real-time visible-talent (RTVT) metadata processor adapted to:
   receive, for the film segment, the frustum-culling information from the RTVF culling processor;
   generate metadata for the film segment based on the frustum-culling information; and
   provide the metadata to a track recorder that records the metadata in association with the film segment.

3. The system of claim 2, wherein the metadata identifies at least one of: (i) the intra-frustum tags and (ii) respective actors associated with the intra-frustum tags.

4. The system of claim 2, wherein the metadata includes delineation of one or more two-dimensional areas of interest for the film segment, wherein each of the one or more two-dimensional areas of interest is determined based on the position of a corresponding wireless tag.

5. The system of claim 4, wherein the metadata is generated by mapping a location for the intra-frustum tags onto the film segment based on the corresponding frustum-culling information for the film segment.

6. The system of claim 2, wherein the metadata:
   identifies at least one of: (i) the intra-frustum tags and (ii) respective actors associated with the intra-frustum tags; and
   includes delineation of one or more two-dimensional areas of interest, wherein each of the one or more two-dimensional areas of interest is determined based on the position of a corresponding wireless tag.

7. The system of claim 1, wherein an object determined to be within the view frustum is determined to be within the view frustum because the object is at a location relative to the camera where the object would be recorded substantially in focus by the camera.

8. The system of claim 1, wherein the tag-associated data comprises, for a particular time and for each of one or more wireless tags, (i) an identification of the tag and (ii) spatial location coordinates for the tag.

9. The system of claim 1, wherein the camera information comprises, for the camera, time, and film segment: (i) camera spatial position and (ii) camera spatial orientation.

10. The system of claim 9, wherein the camera information further comprises, for the camera, time, and film segment, (iii) camera focus-setting information.

11. The system of claim 1, wherein the film segment is a film frame identified by a time code, wherein the time code indicates the film frame's location, in terms of time, within a continuum of frames of a film.

12. The system of claim 1, wherein:
the track recorder records a sequence of film segments to generate an original-footage film;
the original-footage film is edited to remove at least one film segment thereby generating a finished film; and
the finished film is processed, wherein processing includes automatically processing the metadata of a plurality of film segments of the finished film.

13. The system of claim 1, wherein:
the view frustum of the camera is defined by a hither plane and a yon plane;
the hither plane is nearer to the camera than the yon plane;
the received camera information includes at least one of T-stop and f-stop setting, which is used to determine the distances from the camera of the hither plane and the yon plane.

14. The system of claim 1, wherein:
the view frustum of the camera is part of a view cone of the camera;
the view cone of the camera is determined based on the received camera information;
the RTVF culling processor is further adapted to identify one or more of the wireless tags as both within the view cone of the camera and outside the view frustum of the camera.

15. The system of claim 1, wherein the camera is a motion-picture camera.

16. The system of claim 1, wherein the camera is a still camera.

17. A computer-implemented method comprising:
receiving tag-associated data for each of one or more wireless tags;
receiving camera information for a film segment generated by a camera;
processing the received camera information to determine, for the film segment, a view frustum of the camera; and
correlating the tag-associated data with the view frustum for the film segment to generate frustum-culling information identifying one or more of the wireless tags as intra-frustum tags within the view frustum.

18. The method of claim 17, further comprising:
receiving, for the film segment, the frustum-culling information;
generating metadata for the film segment based on the frustum-culling information; and
providing the metadata to a track recorder that records the metadata in association with the film segment.

19. The method of claim 18, wherein the metadata identifies at least one of: (i) the intra-frustum tags and (ii) respective actors associated with the intra-frustum tags.

20. The method of claim 18, wherein the metadata includes delineation of one or more two-dimensional areas of interest for the film segment, wherein each of the one or more two-dimensional areas of interest is determined based on the position of a corresponding wireless tag.

21. The method of claim 20, further comprising generating the metadata by mapping a location for the intra-frustum tags onto the film segment based on the corresponding frustum-culling information for the film segment.

22. The method of claim 18, wherein the metadata:
identifies at least one of: (i) the intra-frustum tags and (ii) respective actors associated with the intra-frustum tags; and
includes delineation of one or more two-dimensional areas of interest, wherein each of the one or more two-dimensional areas of interest is determined based on the position of a corresponding wireless tag.

23. The method of claim 17, wherein the tag-associated data comprises, for a particular time and for each of one or more wireless tags, (i) an identification of the tag and (ii) spatial location coordinates for the tag.

24. The method of claim 17, wherein the camera information comprises, for the camera, time, and film segment: (i) camera spatial position and (ii) camera spatial orientation.

25. The method of claim 24, wherein the camera information comprises, for the camera, time, and film segment, (iii) camera focus-setting information.

26. The method of claim 17, further comprising:
recording a sequence of film segments to generate an original-footage film;
receiving an edited finished film generated by removing at least one film segment from the original-footage film; and
processing the finished film, wherein processing includes automatically processing the metadata of a plurality of film segments of the finished film.

27. The method of claim 26, wherein processing the finished film comprises automatically processing the metadata of the film segments of the finished film to determine, for at least one wireless tag that is an intra-frustum tag for at least one of film segments of the finished film, the total number of film segments in the finished film for which the wireless tag is an intra-frustum tag.

28. The method of claim 27, further comprising:
determining the amount of time that the wireless tag is an intra-frustum tag in the finished film; and
using the determined amount of time and a predetermined formula to determine compensation for an actor associated with the wireless tag.

29. The method of claim 27, wherein:
the metadata of at least one film segment of the finished film includes an indication of the depth of an intra-frustum tag within the view frustum for the at least one film segment;
the method further comprises using the indication of the depth in determining compensation for an actor associated with the intra-frustum tag for the at least one film segment.

30. The method of claim 26, wherein:
the metadata:
identifies at least one of: (i) the intra-frustum tags and (ii) respective actors associated with the intra-frustum tags; and
includes delineation of one or more two-dimensional areas of interest associated with the intra-frustum tags; and
the method further comprises presenting information to a user about the respective actor associated with the intra-frustum tag in response to the user selecting the area of interest associated with the intra-frustum tag.

* * * * *

UNITED STATES PATENT AND TRADEMARK OFFICE
CERTIFICATE OF CORRECTION

PATENT NO.        : 8,587,672 B2                                      Page 1 of 1
APPLICATION NO.   : 13/017510
DATED             : November 19, 2013
INVENTOR(S)       : Wallace It is certified that error appears in the above-identified patent and that said Letters Patent is hereby corrected as shown below:

On the title page item [75] replace the inventor's middle name "Allen" with --Alan--.

Signed and Sealed this
Seventh Day of January, 2014

Margaret A. Focarino
*Commissioner for Patents of the United States Patent and Trademark Office*